United States Patent
Moshasha et al.

(10) Patent No.: US 11,033,050 B2
(45) Date of Patent: Jun. 15, 2021

(54) CIGARETTE ROLLING PAPERS FORMED FROM KOMBUCHA BIOFILMS

(71) Applicants: Shaun Moshasha, Charlottesville, VA (US); Cutter Grathwohl, Charlottesville, VA (US)

(72) Inventors: Shaun Moshasha, Charlottesville, VA (US); Cutter Grathwohl, Charlottesville, VA (US)

(73) Assignee: Kombucha Biomaterials LLC, Charlottesville, VA (US)

( * ) Notice: Subject to any disclaimer, the term of this patent is extended or adjusted under 35 U.S.C. 154(b) by 0 days.

(21) Appl. No.: 16/159,556

(22) Filed: Oct. 12, 2018

(65) Prior Publication Data

US 2019/0174815 A1 Jun. 13, 2019

Related U.S. Application Data

(60) Provisional application No. 62/572,155, filed on Oct. 13, 2017.

(51) Int. Cl.
| | |
|---|---|
| *A24D 1/02* | (2006.01) |
| *A24D 1/00* | (2020.01) |
| *D21H 11/12* | (2006.01) |
| *D21H 11/20* | (2006.01) |
| *B32B 7/06* | (2019.01) |
| *B32B 29/00* | (2006.01) |

(52) U.S. Cl.
CPC ............ *A24D 1/022* (2013.01); *A24D 1/002* (2013.01); *A24D 1/02* (2013.01); *B32B 7/06* (2013.01); *B32B 29/00* (2013.01); *D21H 11/12* (2013.01); *D21H 11/20* (2013.01)

(58) Field of Classification Search
CPC .......... D21H 5/16; D21H 11/12; D21H 11/20; A24D 1/02; A24D 1/002; A24D 1/022; A24D 1/00; B32B 29/00; B32B 7/06; C12N 1/20; C12N 1/14
See application file for complete search history.

(56) References Cited

U.S. PATENT DOCUMENTS

| | | | | |
|---|---|---|---|---|
| 2,503,267 A | * | 4/1950 | Harrison | D21H 5/16 162/139 |
| 2,652,834 A | * | 9/1953 | Schur | D21H 5/16 162/139 |
| 4,450,847 A | * | 5/1984 | Owens | A24D 1/02 131/331 |
| 4,739,775 A | * | 4/1988 | Hampl, Jr. | A24D 1/025 131/349 |
| 4,863,565 A | * | 9/1989 | Johnson | A61L 15/28 162/150 |
| 5,092,353 A | * | 3/1992 | Montoya | A24B 15/14 131/359 |
| 5,263,500 A | * | 11/1993 | Baldwin | A24D 1/02 131/365 |
| 5,263,999 A | | 11/1993 | Baldwin et al. | |
| 5,284,166 A | * | 2/1994 | Cartwright | D21H 21/28 131/358 |
| 5,888,348 A | * | 3/1999 | Hampl, Jr. | A24D 1/02 131/365 |
| 5,921,249 A | * | 7/1999 | Hampl, Jr. | A24D 1/02 131/365 |
| 7,216,652 B1 | * | 5/2007 | Fournier | A24D 1/02 131/349 |
| 7,237,559 B2 | * | 7/2007 | Ashcraft | A24D 1/025 131/360 |
| 10,375,988 B2 | * | 8/2019 | Rose | A24D 1/025 |
| 2002/0012985 A1 | * | 1/2002 | Takebe | C07K 14/415 435/253.6 |
| 2005/0056293 A1 | * | 3/2005 | Zawadzki | A24D 1/025 131/365 |
| 2006/0021625 A1 | | 2/2006 | Nyffeler | |
| 2014/0141123 A1 | * | 5/2014 | Skripitsyna | A23F 3/166 426/60 |
| 2015/0164132 A1 | * | 6/2015 | Eitzinger | A24D 1/025 131/336 |
| 2019/0174815 A1 | * | 6/2019 | Moshasha | A24D 1/002 |

FOREIGN PATENT DOCUMENTS

| | | | | | |
|---|---|---|---|---|---|
| EP | 0186495 A2 | * | 7/1986 | ............ | C09K 19/04 |
| GB | 2169543 A | * | 7/1986 | ............ | C09K 19/04 |
| GB | 2349651 A | * | 11/2000 | ............ | C08B 37/00 |
| GB | 2349651 A | | 11/2000 | | |
| JP | 05295005 A | * | 11/1993 | | |
| WO | WO-03043450 A1 | * | 5/2003 | ............... | A24D 1/02 |
| WO | WO-2019075422 A1 | * | 4/2019 | ............ | A24D 1/002 |

OTHER PUBLICATIONS

Co-Pending International Application No. PCT/US2018/55738 filed Oct. 12, 2018, Written Opinion of the International Searching Authority, dated Dec. 31, 2018, 4 pages.
Co-Pending International Application No. PCT/US2018/55738 filed Oct. 12, 2018, International Search Report, dated Dec. 31, 2018, 14 pages.

\* cited by examiner

*Primary Examiner* — Jose A Fortuna

(74) *Attorney, Agent, or Firm* — Woods Rogers PLC; Nathan A. Evans

(57) ABSTRACT

Rolling papers formed from fermented microbial cellulose derivatives (e.g., Kombucha fermentation biofilms) and methods of manufacture are described.

20 Claims, 6 Drawing Sheets

Results Summary

| Semi-Volatile Organics by GCMS | Kombucha |
|---|---|
| Compounds | Result (mg/Kg) |
| Menthol | ND |
| Nicotine | ND |
| Anabasine | ND |
| 1-Naphthylamine | ND |
| 2-Naphthylamine | ND |
| NNN | ND |
| 4-Aminobiphenyl | ND |
| NNK | ND |

| Volatile Organics by GCMS | Kombucha |
|---|---|
| Compounds | Result (µg/Kg) |
| 1,3-Butadiene | ND |
| Isoprene | ND |
| Acrolein | ND |
| Acrylonitrile | ND |
| Benzene | ND |
| Toluene | ND |

| Aldehydes by HPLC DAD | Kombucha | Rolling Paper |
|---|---|---|
| Compounds | Result (mg/Kg) | Result (mg/Kg) |
| Crotonaldehyde | 4.2 | 16.4 |

Figure 1

Semi Volatile GCMS Analysis for HPHC Compounds

| 07_02J18-019_Kombucha.D | Analyst | JHD |
|---|---|---|
| 4 Oct 2018 1:51 pm | | |
| 02J2018.018 Kombucha | | |
| 0.3172g extracted in 10ml MeOH Chem10924 + IS | Factor | 31.52585 |

| Compound | Response | R.T | On-Column Result (mg/Kg) | Final Result (mg/Kg) |
|---|---|---|---|---|
| Menthol | 2920 | 4.908 | 0.00 | ND |
| Nicotine | 519 | 6.372 | 0.00 | ND |
| Anabasine | 1489 | 7.794 | 0.00 | ND |
| 1-Naphthylamine | 1327 | 7.898 | 0.00 | ND |
| 2-Naphthylamine | 1693 | 8.025 | 0.00 | ND |
| NNN | 1666 | 9.499 | 0.00 | ND |
| 4-Aminobiphenyl | 3063 | 9.579 | 0.00 | ND |
| NNK | 2062 | 10.653 | 0.00 | ND |
| Benzo(a)pyrene | 50635 | 14.424 | 1.00 | 31.53 |

Figure 2

| Unknown Compounds | Response | R.T | On-Column Result (mg/Kg) | Final Result (mg/Kg) | CAS number |
|---|---|---|---|---|---|
| 1,4-Dichlorobenzene-d4 IS/SS | 1242140 | 3.265 | 12.48 | 393.44 | 003855-82-1 |
| 1,4-Dichlorobenzene-d4 IS/SS | 1569340 | 3.467 | 15.77 | 497.16 | 003855-82-1 |
| Nitrobenzene-d5 IS/SS | 1930950 | 3.999 | 19.40 | 611.60 | 000000-00-0 |
| unknown | 1018570 | 4.235 | 10.23 | 322.51 | |
| unknown | 1408230 | 4.649 | 14.15 | 446.09 | |
| 1,2,3,4-Cyclohydro-alpha-d-glucopyranose | 2268250 | 5.719 | 22.79 | 718.47 | 000000-00-0 |
| unknown | 1217550 | 5.478 | 12.23 | 385.56 | |
| unknown | 1228730 | 5.539 | 12.34 | 389.03 | |
| unknown | 2145380 | 5.581 | 21.55 | 679.38 | |
| unknown | 1316190 | 5.732 | 13.22 | 416.77 | |
| 5-(Hydroxymethyl)-2-(dimethoxymethyl)furan | 1521770 | 5.840 | 15.29 | 482.03 | 000000-00-0 |
| unknown | 3749740 | 5.977 | 37.67 | 1187.58 | |
| unknown | 1165950 | 6.165 | 11.71 | 369.17 | |
| unknown | 1646470 | 6.269 | 17.40 | 548.55 | |
| 1,2,3-Benzenetriol | 5484310 | 6.566 | 57.95 | 1826.92 | 000087-64-1 |
| unknown | 5636080 | 9.344 | 37.39 | 1178.75 | |
| Tetradecanoic acid | 2025400 | 9.574 | 13.44 | 423.71 | 000544-63-8 |
| unknown | 1792940 | 9.960 | 11.89 | 374.84 | |
| Caffeine | 5127180 | 10.144 | 34.01 | 1072.19 | 000058-08-2 |
| (DEL) Alkane, Branched | 2664120 | 10.648 | 17.67 | 557.06 | |
| Palmitic Acid | 13746780 | 10.752 | 91.19 | 2874.84 | 000057-10-3 |
| 9-Octadecenoic acid (Z)- | 13385600 | 11.618 | 52.18 | 1645.02 | 000112-80-1 |
| unknown | 2222820 | 15.069 | 12.76 | 402.27 | |

Figure 3

Volatile GCMS Analysis for HPHC Compounds

| 07_02J18-018_Kombucha.D | Analyst | JHD |
|---|---|---|
| 8 Oct 2018 2:30 pm | | |
| 02J18.018 Kombucha | | |
| 0.3172g extracted in 10ml MeOH Chem10924 + IS | Factor | 31.52585 |

| Compound | Response | R.T | On-Column Result (mg/Kg) | Final Result (mg/Kg) |
|---|---|---|---|---|
| 1,3-Butadiene | 0 | 0.580 | 0 | ND |
| Isoprene | 0 | 0.973 | 0 | ND |
| Acrolein | 0 | 1.019 | 0 | ND |
| Acrylonitrile | 0 | 1.466 | 0 | ND |
| Benzene | 0 | 3.227 | 0 | ND |
| Toluene | 0 | 5.004 | 0 | ND |

Figure 4

| Unknown Compounds | Response | R.T | On-Column Result (mg/Kg) | Final Result (mg/Kg) | CAS number |
|---|---|---|---|---|---|
| unknown | 354150 | 0.357 | 16.61 | 523.64 | 003855-82-1 |
| unknown | 3150240 | 0.73 | 147.72 | 4657.00 | 000080-71-7 |
| METHYLENE CHLORIDE (solvent for IS/SS) | 71178600 | 1.34 | 3337.58 | 105220.05 | 003855-82-1 |
| unknown | 159168 | 2.087 | 7.46 | 235.18 | 000000-00-0 |
| Benzene, pentafluoro- (CAS) IS/SS | 615098 | 3.029 | 28.84 | 909.21 | |
| unknown | 325310 | 4.214 | 15.25 | 480.77 | |
| unknown | 138251 | 4.646 | 6.48 | 204.29 | 000120-80-9 |
| unknown | 319489 | 5.629 | 7.67 | 241.80 | 000000-00-0 |
| 3-FURALDEHYDE | 307739 | 6.182 | 7.39 | 232.98 | 000067-47-0 |
| Dimethoxytetrahydrofuran isomer | 204684 | 6.229 | 4.92 | 155.11 | |
| unknown | 604941 | 6.490 | 14.53 | 458.07 | |
| unknown | 2160100 | 7.05 | 9.87 | 311.16 | |
| unknown | 4048390 | 7.299 | 18.5 | 583.23 | 000000-00-0 |

Figure 5

| Material | Weight (g) | Burn Time (s) | Burn Rate (g/s) | Avg (g/s) | Standard Deviation |
|---|---|---|---|---|---|
| Kombucha | 0.055 | 14.2 | 0.00387 | | |
| Kombucha | 0.055 | 15.71 | 0.00350 | | |
| Kombucha | 0.054 | 15.4 | 0.00351 | 0.00374 | 0.000371 |
| Kombucha | 0.056 | 16.03 | 0.00349 | | |
| Kombucha | 0.055 | 12.67 | 0.00434 | | |
| Standard Paper | 0.055 | 9.3 | 0.00591 | | |
| Standard Paper | 0.055 | 9.32 | 0.00590 | | |
| Standard Paper | 0.055 | 9.38 | 0.00586 | 0.00586 | 0.0000548 |
| Standard Paper | 0.055 | 9.51 | 0.00578 | | |
| Standard Paper | 0.055 | 9.45 | 0.00582 | | |

Figure 6

CIGARETTE ROLLING PAPERS FORMED FROM KOMBUCHA BIOFILMS

CROSS-REFERENCE TO RELATED APPLICATIONS

This application relies on the disclosure of and claims priority to and the benefit of the filing date of U.S. Provisional Application No. 62/572,155 filed Oct. 13, 2017, the disclosure of which is hereby incorporated by reference in its entirety.

BACKGROUND OF THE INVENTION

Field of the Invention

The present invention relates to rolling papers formed from fermented microbial cellulose derivatives (e.g., Kombucha fermentation biofilms), such as cigarette rolling papers.

Description of Related Art

Kombucha is the name for a fermented tea that has been popular in many cultures throughout the eastern hemisphere for thousands of years. These cultures claim a significant health benefit to be gained by drinking Kombucha, namely due to the high nutritional content and probiotic activity of the beverage. The name of the beverage in many cultures translates into "tea fungus" or "tea mushroom" due to the growth of a gelatinous biofilm (also known as a pellicle) at the liquid-gas interface. The biofilm is not a mushroom. Kombucha is grown from what is known as a SCOBY, or a Symbiotic Colony of Bacteria and Yeast. While the microbial makeup of the SCOBY varies depending on the source of the culture, some of the more persistent organisms contained within Kombucha include *Saccharomyces* and *Gluconacetobacter xylinus*.

Traditionally, the gelatinous biofilm formed on top of the Kombucha culture is a waste product of the fermentation process that has been discarded. However, the biofilm produced is high quality microbial cellulose that has many potential applications. Recently, some designers have begun to produce leather made from the Kombucha biofilm.

It would be beneficial to find commercial applications for the Kombucha biofilm.

SUMMARY OF THE INVENTION

The current state of paper making including the use of industrial chemicals in the process which are detrimental to the environment and human health. Further, adding additives to papers such as pigmentation requires post-manufacturing processing which can be labor intensive.

Accordingly, in an aspect, the present invention provides a novel cigarette rolling paper product, comprising: microbial cellulose derived from Kombucha fermentation.

In another aspect, the present invention provides a novel cigarette rolling paper product, comprising: microbial cellulose derived from Kombucha fermentation, wherein the rolling paper is substantially free from harmful and potentially harmful constituents (HPHCs).

In another aspect, the present invention provides a novel cigarette rolling paper product, comprising: microbial cellulose derived from Kombucha fermentation, wherein the rolling paper is substantially free of adhesive additives.

In another aspect, the present invention provides a cigarette rolling paper product derived from Kombucha fermentation and a process of manufacture which exhibits unique properties such as the ability to add additives during paper production without additional steps and the lack of need for industrial chemicals.

Additional Aspects are provided below:

Aspect 1. A product comprising:
cellulose from a microbe grown in a symbiotic colony of bacteria and yeast (SCOBY);
wherein the product is a paper having one or more properties suitable for use as a cigarette rolling paper.

Aspect 2. The product of Aspect 1, wherein the one or more properties comprise burn rate, permeability, porosity, tensile strength, tearing strength, basis weight, and/or opacity.

Aspect 3. The product of any preceding Aspect, wherein the paper has a burn rate in the range of 0.001-0.006 g/s, a porosity in the range of 1-10 CU, a tensile strength in the range of 10-35 N, a tension strength in the range of 1-10%, and/or basis weight in the range of 10-40 GSM.

Aspect 4. The product of any preceding Aspect, wherein the SCOBY is formed during Kombucha culture and/or fermentation.

Aspect 5. The product of any preceding Aspect wherein the product does not comprise an adhesive. The product of any preceding Aspect, wherein the product contains substantially reduced levels of Crotonaldehyde, from 16.4 mg/Kg in control rolling paper, to 4.2 mg/Kg in Kombucha rolling paper. The amount of Crotonaldehyde in the rolling paper taught herein is preferably less than 15 mg/Kg.

Aspect 6. The product of any preceding Aspect, wherein the product does not comprise harmful and potentially harmful constituents (HPHCs), comprising N-Nitrosonornicotine, Anabasine, and Isoprene.

Aspect 7. The product of any preceding Aspect, wherein the product does not comprise harmful and potentially harmful constituents (HPHCs) comprising N-Nitrosonornicotine, Anabasine, Isoprene, Benzene, Toluene, NNK, 4-aminobiphenyl, 2-Naphthylamine, Acrolein, and 1,3-butadiene.

Aspect 8. The product of any preceding Aspect, wherein the product does not comprise harmful and potentially harmful constituents (HPHCs) comprising Acetaldehyde, Acetamide, Acetone, Acrolein, Acrylamide, Acrylonitrile, Aflatoxin B1, 4-Aminobiphenyl, 1-Aminonaphthalene, 2-Aminonaphthalene, Ammonia, Anabasine, o-Anisidine, Arsenic, A-α-C (2-Amino-9H-pyrido[2,3-b]indole), Benz[a]anthracene, Benz[j]aceanthrylene, Benzene, Benzo[b]fluoranthene, Benzo[k]fluoranthene, Benzo[b]furan, Benzo[a]pyrene, Benzo[c]phenanthrene, Beryllium, 1,3-Butadiene, Cadmium, Caffeic acid, Carbon monoxide, Catechol, Chlorinated dioxins/furans, Chromium, Chrysene, Cobalt, Coumarin, Cresols (o-, m-, and p-cresol), Crotonaldehyde, Cyclopenta[c,d]pyrene, Dibenz[a,h]anthracene, Dibenzo[a,e]pyrene, Dibenzo[a,h]pyrene, Dibenzo[a,i]pyrene, Dibenzo[a,l]pyrene, 2,6-Dimethylaniline, Ethyl carbamate (urethane), Ethylbenzene, Ethylene oxide, Formaldehyde, Furan, Glu-P-1 (2-Amino-6-methyldipyrido[1,2-a: 3',2'-d]imidazole), Glu-P-2 (2-Aminodipyrido[1,2-a:3',2'-d]imidazole), Hydrazine, Hydrogen cyanide, Indeno[1,2,3-cd]pyrene, IQ (2-Amino-3-methylimidazo[4,5-f]quinoline), Isoprene, Lead, MeA-α-C (2-Amino-3-methyl)-9H-pyrido[2,3-b]indole), Mercury, Methyl ethyl ketone, 5-Methylchrysene, 4-(Methylnitrosamino)-1-(3-pyridyl)-1-butanone (NNK), Naphthalene, Nickel, Nicotine, Nitrobenzene, Nitromethane, 2-Nitropropane, N-Nitrosodiethanolamine (NDELA), N-Nitrosodiethylamine, N-Nitrosodimethylamine (NDMA), N-Nitrosomethylethylamine, N-Nitrosomorpholine (NMOR), N-Nitrosonornicotine (NNN), N-Nitrosopiperidine (NPIP), N-Nitrosopyrrolidine (NPYR), N-Nitrososarcosine (NSAR), Nornicotine, PhIP (2-Amino-1-methyl-6-phenylimidazo[4,5-b]pyridine), Polonium-210, Propionaldehyde, Propylene oxide, Quinoline, Selenium, Styrene, o-Toluidine, Toluene, Trp-P-1 (3-Amino-1,4-dimethyl-5H-pyrido[4,3-b]indole), Trp-P-2 (1-Methyl-3-amino-5H-pyrido[4,3-b]indole), Uranium-235, Uranium-238, Vinyl acetate, or Vinyl chloride.

Aspect 9. The product of any preceding Aspect, wherein the product further comprises 0.1%-99.9% by weight of a non-microbial cellulose fiber comprising hemp, flax, eucalyptus, and/or cotton or any combination thereof.

Aspect 10. The product of any preceding Aspect, wherein the product further comprises up to 50% by weight of a paper additive comprising calcium carbonate, formation aid PEO, lime, soda ash, coagulant, kaolin clay, flame retardant, gelatin sizing, sizing, and/or methyl cellulose, or any combination thereof.

Aspect 11. A product of any preceding Aspect, wherein the product further comprises at least one additive comprising a flavorant, a colorant, and/or a vitamin or any combination thereof, introduced in the SCOBY.

Aspect 12. The product of any preceding Aspect, further comprising at least one botanical.

Aspect 13. A product comprising:
a sheet of pulp processed into a cigarette rolling paper;
wherein the pulp comprises microbial cellulose from a biofilm harvested from a symbiotic colony of bacteria and yeast (SCOBY).

Aspect 14. The product of any preceding Aspect, wherein the SCOBY is formed during Kombucha culture and/or fermentation.

Aspect 15. The product of any preceding Aspect, wherein the product does not comprise an adhesive.

Aspect 16. The product of any preceding Aspect, wherein the product does not comprise harmful and potentially harmful constituents (HPHCs) comprising N-Nitrosonornicotine, Anabasine, and Isoprene.

Aspect 17. The product of any preceding Aspect, wherein the product does not comprise harmful and potentially harmful constituents (HPHCs) comprising N-Nitrosonornicotine, Anabasine, Isoprene, Benzene, Toluene, NNK, 4-aminobiphenyl, 2-Naphthylamine, Acrolein, and 1,3-butadiene.

Aspect 18. A method comprising:
culturing a symbiotic colony of bacteria and yeast (SCOBY) to form a biofilm;
harvesting the biofilm;
preparing a pulp comprising microbial cellulose from the biofilm; and
manufacturing a cigarette rolling paper from the pulp.

Aspect 19. A cigarette rolling paper product comprising microbial cellulose.

Aspect 20. The cigarette rolling paper product of any preceding Aspect, wherein the microbial cellulose is obtained from a process comprising:
culturing a symbiotic colony of bacteria and yeast (SCOBY) to form a biofilm;
harvesting the biofilm; and
preparing a pulp from the biofilm to obtain the microbial cellulose.

Aspect A1. A cigarette rolling paper product, comprising: microbial cellulose derived from Kombucha fermentation.

Aspect A2. The cigarette rolling paper product of any preceding Aspect, wherein harmful and potentially harmful constituents (HPHCs) are substantially less than other cigarette rolling paper products.

Aspect A3. The cigarette rolling paper product of any preceding Aspect, wherein the paper is substantially free of adhesive additives.

Aspect A4. The cigarette rolling paper product of any preceding Aspect wherein: the dimensions of the paper are from 2×7 cm to 5×14 cm and the weight is from 10-40 g/m2.

Aspect A5. The cigarette rolling paper product of any preceding Aspect, wherein the paper comprises: 0%-99.9% by weight of a non-microbial cellulose fiber.

Aspect A6. The cigarette rolling paper product of any preceding Aspect, wherein the non-microbial cellulose fiber is selected from: hemp, flax, eucalyptus, and cotton or a combination thereof.

Aspect A7. The cigarette rolling paper product of any preceding Aspect, further comprising: at least one of a chemical selected from: a flavorant, a colorant, and a vitamin or a combination thereof.

Aspect A8. The cigarette rolling paper product of any preceding Aspect wherein the flavorant is selected from: beet juice, lemon juice, mint, or another natural fruit or vegetable flavor.

Aspect A9. The cigarette rolling paper product of any preceding Aspect, wherein the color of the paper is selected from: tan (derived from black tea), purple (derived from red wine), and white (derived from white wine).

Aspect A10. The cigarette rolling paper product of any preceding Aspect, wherein the paper further comprises: up to 50% by weight of a paper additive.

Aspect A11. The cigarette rolling paper product of any preceding Aspect, wherein the paper further comprises: an additive selected from: calcium carbonate, formation aid PEO, lime, soda ash, coagulant, kaolin clay, flame retardant, gelatin sizing, sizing, methyl cellulose, or a combination thereof.

Aspect A12. The cigarette rolling paper product of any preceding Aspect, wherein the porosity of the paper is about 5.33 CU.

Aspect A13. The cigarette rolling paper product of any preceding Aspect, wherein the tensile strength of the paper is about 21.83N.

Aspect A14. The cigarette rolling paper product of any preceding Aspect, wherein the paper further comprises: a flavorant derived from the microbial cellulose being flavored by an additive selected from: beet juice, lemon juice, mint, or any other fruit/vegetable, or organic product.

Aspect A15. The cigarette rolling paper product of any preceding Aspect, wherein the cigarette rolling paper product, further comprises: a vitamin or a botanical.

Aspect A16. The cigarette rolling paper product of any preceding Aspect, wherein the vitamin is selected from B12, A, C, D, and E.

Aspect A17. The cigarette rolling paper product of any preceding Aspect, wherein the botanical is selected from acai, green tea, black tea, and grape seed.

Aspect A18. The use of the Kombucha symbiotic culture to convert organic waste matter & effluent from industrial agriculture and product processes into value added paper products.

Aspect A19. Industrial process to include but not limited to: distillery waste effluent, Brewery waste effluent, industrial hemp processing (baste, stocks, oils), tea packaging waste, primary tobacco processing waste, secondary tobacco processing waste, orange fruit juicing & pulp waste, corn syrup waste, shellfish waste, feedstock waste.

Aspect A20. The cigarette rolling paper product of any preceding Aspect, wherein the addition of the Kombucha fiber into the cigarette rolling paper product reduces the burn temperate and the temperature of combusted constituents contained within.

Aspect A21. Using Kombucha instead of a mono-culture of acetic acid bacteria (*Glucanoacetobacter xylinum*) is more efficient for MC production due to robust resistance to colonization and infection by pathogenic microbes for the manufacture of a paper/cigarette rolling paper product.

These and other aspects, which will become apparent during the following detailed description, have been achieved by the inventors' discovery that microbial cellulose derived from Kombucha fermentation can be used to make a rolling paper (e.g., for cigarettes).

BRIEF DESCRIPTION OF THE DRAWINGS

The accompanying drawings illustrate certain aspects of some of the embodiments of the present invention, and should not be used to limit or define the invention. Together with the written description the drawings serve to explain certain principles of the invention.

FIG. 1 is a table showing results of semi-volatile and volatile GCMS analysis of Kombucha paper.

FIG. 2 is a table showing results of semi-volatile GCMS analysis of known HPHC compounds from Kombucha paper.

FIG. 3 is a table showing results of semi-volatile GCMS analysis of unknown HPHC compounds from Kombucha paper.

FIG. 4 is a table showing results of volatile GCMS analysis of known HPHC compounds from Kombucha paper.

FIG. 5 is a table showing results of volatile GCMS analysis of unknown HPHC compounds from Kombucha paper.

FIG. 6 is a table showing results of a burn rate test of rolling paper taught according to the invention herein versus standard rolling paper.

DETAILED DESCRIPTION OF VARIOUS EMBODIMENTS OF THE INVENTION

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

All references cited herein are hereby incorporated in their entirety herein by reference.

The Kombucha culture is composed of several microorganisms that balance each other to produce an enriched beverage and a biofilm. This biofilm is a form of microbial cellulose, or cellulose made from microorganisms. While microbial cellulose has been used previously for several applications, the production of it has often been considered cost prohibitive. The present invention relates to the production and use of microbial cellulose from Kombucha and other fermented cultures. While both Kombucha fermentation and paper making has been known for several thousand years, this innovation is the novel and non-obvious combination of these two processes in order to create a new product. Additionally, the use of Kombucha as a paper substrate or as an additive presents several unexpected advantages that lead to the development of a superior, smokable rolling paper. We have, for the first time in history, demonstrated the use of Kombucha to create a cigarette rolling paper.

The use of Kombucha waste product as a source of cellulose has several advantages over current cellulose production methods. Traditionally, trees, flax, or hemp are used to make paper. For example, in an energy, water, and chemical intensive process, a tree is ground down into chips and chemically digested in order to remove lignin, hemicellulose and other materials to isolate the cellulose. While hemicellulose and lignin have uses as biofuel ethanol substrate and other chemical reactants, only 33% of the tree is cellulose, which means the remainder is a waste product for the purposes of papermaking. Kombucha biofilm production can be used as an environmentally friendly alternative to plant-based cellulose production. Less energy is used, less water is polluted or must be treated, and fewer trees are harvested.

Additionally, the present inventors have discovered that microbial cellulose can be added to a paper with one or more properties that make the paper suitable for use as a cigarette rolling paper. Not any paper will be suitable for smoking; rolling paper is a specialty paper which must have several properties which are tailored for use as a smoking material, including but not limited to burn rate, permeability, porosity, tensile strength, tearing strength, basis weight, and/or opacity. The present inventors have found for the first time that paper made from microbial cellulose can be imparted with such properties and thus can be manufactured as a cigarette rolling paper product.

Every batch of Kombucha contains: (1) at least one beneficial yeast, (2) *Acetobacter* (the beneficial bacteria in the SCOBY), (3) gluconic acid (a pH regulator), and (4) acetic acid (an anti-microbial acid, which also stabilizes blood sugar). Most batches of Kombucha will also contain an analgesic (pain reliever), an anti-arthritic compound, an anti-spasmodic compound, a liver-protective compound, and several anti-bacterial compounds. The final Kombucha product contains a blend of beneficial bacteria and yeast (probiotics) as well as certain acid, enzymes, vitamins and other nutrients that aid digestion, detoxify the body, and promote health.

In an aspect, the present invention provides a novel cigarette rolling paper, comprising: microbial cellulose derived from Kombucha fermentation.

The rolling paper can be used for smoking. Such uses include, but are not limited to tobacco, cannabis, hash, cloves, damiana, and any other legally consumable smokable product.

Microbial cellulose refers to the biofilm created by microbial cultures upon conversion of a nutrient substrate during the fermentation process also known as SCOBY. Examples of the nutrient substrate include: red wine, white wine, malts/beers, and residual juices from fruits (e.g., tangerine or lime), vegetables, coconut milk, or other organic matter.

In another aspect, the present invention provides a novel cigarette rolling paper, wherein harmful and potentially harmful constituents (HPHCs) are substantially less than other rolling papers.

In another aspect, the paper is substantially free of adhesive additives.

In another aspect, the dimensions of the paper are from 2×7 cm to 5×14 cm and the weight is from 10-40 g/m$^2$.

In another aspect, the paper comprises: 0%-99.9% by weight non-microbial cellulose fiber.

In another aspect, the non-microbial cellulose fiber is selected from: hemp, flax, eucalyptus, and cotton or a combination thereof.

In another aspect, the novel rolling paper further comprises: at least one of a chemical selected from: a flavorant, a colorant, and a vitamin or a combination thereof.

In another aspect, the flavorant is selected from: beet juice, lemon juice, mint, or another natural fruit or vegetable flavor. The flavorant can also be selected from oil soluble flavoring agents such as spearmint oil, cinnamon oil, oil of wintergreen (methylsalicylate), peppermint oils, clove oil, bay oil, anise oil, eucalyptus oil, thyme oil, cedar leaf oil, oil of nutmeg, oil of sage, oil of bitter almonds, peanut butter flavor, chocolate flavor, rum flavor, cassia oil, cinnamon mint flavor, and water soluble flavor ingredients such as various fruit extracts such as pineapple, mango, apple, banana, blackberry, blueberry, strawberry, peach, plum, grape, orange, tangerine, grapefruit, passion fruit, kiwi, pomegranate, raspberry, lime, and the like, artificial flavor ingredients and the like.

In another aspect, the color of the paper is selected from: tan (e.g., derived from black tea), purple (e.g., derived from red wine), and white (e.g., derived from white wine). The colorant can be selected from natural food colorants including anthocyanins, canthaxanthin, chlorophyll, charcoal, cochineal, iron oxide, paprika, saffron, turmeric, and the like. The colorant can also be an artificial colorant. Artificial colorants include dyes and lakes, with dyes being more soluble in water and lakes being dispersible in fats and oils. Examples of artificial colors include FD&C Blue Nos. 1 and 2, FD&C Green No. 3, FD&C Red No. 3, FD&C Red No. 40, FD&C Yellow No. 5, and FD&C Yellow No. 6.

In another aspect, the paper further comprises: up to 50% by weight of a paper additive.

In another aspect, the paper additive is selected from: calcium carbonate, formation aid PEO, lime, soda ash, coagulant, kaolin clay, flame retardant, gelatin sizing, sizing, methyl cellulose, or a combination thereof.

In another aspect, the porosity of the paper is about 5.33 CU, such as from about 2-8 CU, or from about 3-7 CU, or from about 4-6 CU, or from about 4.5-5.5 CU.

In another aspect, the tensile strength of the paper is about 21.83 N, such as from about 10-40 N, or from about 15-30 N, or from about 20-25 N, or from about 16-22 N.

In another aspect, the paper is flavored by other additives in the Kombucha. For example, Kombucha can be flavored by both natural and synthetic additives, including beet juice, lemon juice, mint, or any other fruit/vegetable, or organic product.

In another aspect, the cigarette rolling paper further comprises: a vitamin or a botanical. Examples of vitamins include: A, B1, B2, B3, B5, B6, B7, B9, B12, C, D, E, and K. Examples of botanicals include: acai, green tea, black tea, and grape seed, aloe, hemp seed extract, hibiscus, yarrow, and agave.

In another aspect, the cigarette rolling paper includes one or more additives (e.g. a flavorant, a colorant, a vitamin, and/or a psychoactive ingredient, or any combination thereof), introduced in the SCOBY. Any of the additives described herein may be introduced in the nutrient substrate and taken up into the SCOBY during its culture and/or fermentation. As such, the rolling paper product will contain such additives without requiring additional post-processing.

In another aspect, the rolling paper does not comprise one or more compounds on the U.S. Food & Drug (FDAs) established list of HPHCs. In one aspect, the rolling paper does not include one or more of Acetaldehyde, Acetamide, Acetone, Acrolein, Acrylamide, Acrylonitrile, Aflatoxin B1, 4-Aminobiphenyl, 1-Aminonaphthalene, 2-Aminonaphthalene, Ammonia, Anabasine, o-Anisidine, Arsenic, A-α-C (2-Amino-9H-pyrido[2,3-b]indole), Benz[a]anthracene, Benz[j]aceanthrylene, Benzene, Benzo[b]fluoranthene, Benzo[k]fluoranthene, Benzo[b]furan, Benzo[a]pyrene, Benzo[c]phenanthrene, Beryllium, 1,3-Butadiene, Cadmium, Caffeic acid, Carbon monoxide, Catechol, Chlorinated dioxins/furans, Chromium, Chrysene, Cobalt, Coumarin, Cresols (o-, m-, and p-cresol), Crotonaldehyde, Cyclopenta[c,d]pyrene, Dibenz[a,h]anthracene, Dibenzo[a,e]pyrene, Dibenzo[a,h]pyrene, Dibenzo[a,i]pyrene, Dibenzo[a,l]pyrene, 2,6-Dimethylaniline, Ethyl carbamate (urethane), Ethylbenzene, Ethylene oxide, Formaldehyde, Furan, Glu-P-1 (2-Amino-6-methyldipyrido[1,2-a:3',2'-d]imidazole), Glu-P-2 (2-Aminodipyrido[1,2-a:3',2'-d]imidazole), Hydrazine, Hydrogen cyanide, Indeno[1,2,3-cd]pyrene, IQ (2-Amino-3-methylimidazo[4,5-f]quinoline), Isoprene, Lead, MeA-α-C (2-Amino-3-methyl)-9H-pyrido[2,3-b]indole), Mercury, Methyl ethyl ketone, 5-Methylchrysene, 4-(Methylnitrosamino)-1-(3-pyridyl)-1-butanone (NNK), Naphthalene, Nickel, Nicotine, Nitrobenzene, Nitromethane, 2-Nitropropane, N-Nitrosodiethanolamine (NDELA), N-Nitrosodiethylamine, N-Nitrosodimethylamine (NDMA), N-Nitrosomethylethylamine, N-Nitrosomorpholine (NMOR), N-Nitrosonornicotine (NNN), N-Nitrosopiperidine (NPIP), N-Nitrosopyrrolidine (NPYR), N-Nitrososarcosine (NSAR), Nornicotine, PhIP (2-Amino-1-methyl-6-phenylimidazo[4,5-b]pyridine), Polonium-210, Propionaldehyde, Propylene oxide, Quinoline, Selenium, Styrene, o-Toluidine, Toluene, Trp-P-1 (3-Amino-1,4-dimethyl-5H-pyrido[4,3-b]indole), Trp-P-2 (1-Methyl-3-amino-5H-pyrido[4,3-b]indole), Uranium-235, Uranium-238, Vinyl acetate, or Vinyl chloride.

Definitions

The following definitions are meant to illustrate, not limit, the present invention.

SCOBY means a Symbiotic Colony of Bacteria and Yeast. The microorganisms contained in the SCOBY include, but are not limited to any yeasts, including *Saccharomyces cerevisiae, Brettanomyces bruxellensis, Candida stellata, Schizosaccharomyces pombe*, and *Zygosaccharomyces bailii* and any other microorganism derived from the genera *Acetobacter, Rhizobium, Agrobacterium, Pseudomonas, Gluconacetobacter, Alcaligenes, Lactobacillus, Lactococcus, Leuconostoc, Bifidobacterium, Thermus, Allobaculum, Ruminococcaceae* Incertae *sedis, Enterococcus*, and *Propionibacterium*.

As used herein, "cigarette rolling paper product", "cigarette rolling paper", "rolling paper", and "paper" are used interchangeably, and refer to a specialty paper with several properties which are tailored for use as a smoking material.

The cigarette rolling paper can be manufactured in any dimension conventionally used within the rolling paper industry. For example, rolling papers are often sold in lengths between 70 mm through 110 mm and a range of widths. Most manufacturers sell rolling paper in the USA using the designations of 1 (Single wide), 1¼ size, 1½ size and "Doublewide" (2 or 2.0). However, within the industry, these designations have slightly different meanings, wherein the size references are not definitive but moreover a general size. Across the various brands of cigarette papers the actual widths of the papers using these designations vary greatly. For example, the 1¼ designation is used with papers having widths ranging from about 1.7 inches to 2 inches, and the 1½ designation is used with papers having widths ranging from around 2.4 to 3 inches. However the length of these papers is always 78 mm (+/−1 mm). It is noted that the 1¼ size is also referred to as "Spanish Size" or "French" rolling paper in some parts of the world.

While a 1¼ sized paper is not exactly 25% larger than a 1 (single wide) paper, there is meaning to these size names. A better way to describe these accurately is that a 1¼ size is designed to roll a cigarette that contains about 25% more filler than a single wide paper. Similarly a 1½ size paper is designed to roll a cigarette that contains about 50% more than a single wide paper. A 1¼ size paper is larger than a 1 (single wide) paper and naturally a 1½ size paper is larger than a 1¼ size paper, and a double wide is larger than a 1½ size paper.

King Size is another multi-meaning term. While a King Size cigarette is typically 84 mm long, a King Size rolling paper is either 100 mm or 110 mm in length.

Other features of the invention will become apparent in the course of the following descriptions of exemplary embodiments that are given for illustration of the invention and are not intended to be limiting thereof.

EXAMPLES

The following examples are representative of the procedures used to prepare the compounds of the present invention.

Example 1: General Preparation of Material Used for Rolling Paper

A sufficient amount of distilled water to fill a container 4" in height is boiled for 20 min. Loose tea (e.g., one or more of black, green, etc.)(12 g/L)(unflavored)(no additives) is steeped in the distilled water for 30 min. Sucrose, 62 g/L, is added into the mixture and stirred until completely dissolved (other nutrient sources can also be used). Vinegar, 1/25 parts, is added to the mixture and the resulting mixture is allowed to cool until 30-35° C. The mixture is then poured into the desired fermentation container. The bacterial culture is then inoculated at a ratio of 1/4 into the substrate media.

The bacteria culture is a symbiotic colony comprising at least *Gluconacetobacter xylinus*. Other microorganisms contained in the culture may include, but are not limited to any yeasts, including *Saccharomyces cerevisiae, Brettanomyces bruxellensis, Candida stellata, Schizosaccharomyces pombe,* and *Zygosaccharomyces bailii* and any other microorganism derived from the genera *Acetobacter, Rhizobium, Agrobacterium, Pseudomonas, Gluconacetobacter, Alcaligenes, Lactobacillus, Lactococcus, Leuconostoc, Bifidobacterium, Thermus, Allobaculum, Ruminococcaceae,* Incertaesedis, *Enterococcus,* and *Propionibacterium*.

The culture is then covered in an air permeable membrane and left for from 7-21 days. About every 4 days the sides of the container are mechanically warped to give a slight bend and let gases escape that would otherwise prevent the bacteria from coming into contact with the substrate nutrients. This 'belching' can also be accomplished by depressing the microbial mat forcing accumulated gas to escape. The culture is kept in an ambient environment with a temperature of around 30° C. The pH of the culture is maintained from 4-6 becoming more acidic as the fermentation is prolonged.

The cover is eventually removed as the biofilm is harvested. After being weighed, the cellulose is steeped in a 50 gallon drum of distilled water to reduce the acidity. After steeping for 3 hours, the microbial mat (or mats) is blended using a large scale industrial slicer for 15 minutes per batch to form a pulp-like material. The pulp can then be introduced to a fruit pulverizer to pulverize the fibers into a consistent homogeneous slurry. The slurry is surrounded by a contained mesh and 12 tons of force is applied by means of a hydraulic press for 5-20 min in order to dry the pulp and resulting in a 20-70% (by weight) moisture content. Additionally if a greater dryness is desired the pulp may be introduced to a dehydrator or freeze drying process to approach water content on the order of 4-15% (by weight). This pulp is now prepared to be distributed to paper manufacturers to produce paper with the specific size, thickness, and flexibility.

Results from paper formed according to the present invention are provided below.

Fibertests of the Different Trials/Pulps

| Sample Name | Mean Length mm | Mean Width μm | Mean shape % | Coarseness | Mean kink angle |
|---|---|---|---|---|---|
| Kombucha__1300rpm__50° C. | 0.84 | 39 | 74.1 | 694 | 57.7 |
| Kombucha1.1%__1000rpm__85° C.__Ultra Turrax | 0.58 | 36 | 75.4 | 1292 | 57.1 |
| Kombucha0.5%__1000rpm__20° C.__Ultra Turrax | 0.65 | 39 | 73.3 | 1324 | 52.3 |

First QA Measurements

We have done some measurements on typical parameters for paper production with "hand-crafted" papers by Shaun. As the paper was produced manually, you can see a high variation/SD.

Measurements were Done in the PFW/QA-Lab

| Sample | Tensile Strength N | Tension % | Porosity CU | Grammage g/m² | COBB 60 | Smoothness TS | Smoothness WS |
|---|---|---|---|---|---|---|---|
| 1 | 25.8 | 3.3 | 10 | 18.55 | | 32.7 | 4.8 |
| 2 | 16.5 | 2.7 | measurement | 14.08 | | 23.1 | 3.6 |
| 3 | 23.2 | 3.2 | points | 17.33 | | 15.6 | 2.4 |
| Average | 21.83 | 3.05 | 5.333 | 16.65 | 14.8 | 23.80 | 3.60 |
| SD | 4.8 | 0.32 | 1.603 | 2.31 | | 8.57 | 1.20 |

Example 2

Burn tests (pyrolysis) for Kombucha rolling paper as taught herein were performed using gas chromatography-gas spectroscopy. The results are shown in FIGS. 1-5.

Example 3

Burn rate tests were conducted for Kombucha rolling paper as taught herein versus standard rolling paper. The results are shown in FIG. 6.

Effluent from current paper pulp processes include the following, most or all of which are not generated from the effluent according to the current invention:

Air Emissions:
  Hydrogen sulfide—smell of rotten eggs, corrosive, flammable, poisonous
  Methyl mercaptan—putrid smell, main component of bad breath, flammable
  Dimethyl sulfide—characteristic disagreeable odor, flammable
  Dimethyl Disulfide—flammable liquid with garlic-like odor
  Other volatile sulfur compounds that malodorous air emissions
  Nitrogen Oxides (component of acid rain)
  Sulfur Oxides (component of acid rain)
  Carbon Monoxide (air and water)
  Ammonia (air and water)
  Mercury (Air and water)
  Nitrates (Air and Water)—contributes to the eutrophication of freshwater bodies
  Benzene
  Effluent discharge: (Delignifications of chemical pulps release considerable amounts
  of organic materials into lakes and rivers)
  Sodium Hydroxide
  Sodium Sulfide
  Dioxin
  Lignins
  High biological oxygen demand
  High dissolved organic carbon
  Alcohols
  Chlorates
  Heavy metals
  Chelating agents
  Bleaching agents (chlorine)
  Organochlorine The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

Numerous modifications and variations of the present invention are possible in light of the above teachings. It is therefore to be understood that within the scope of the appended claims, the invention may be practiced otherwise than as specifically described herein.

REFERENCES

All references cited in this application are incorporated herein by reference, including:

Jessica Martínez Leal, Lucía Valenzuela Suárez, Rasu Jayabalan, Joselina Huerta Oros & Anayansi Escalante-Aburto (2018), A review on health benefits of kombucha nutritional compounds and metabolites, CyTA—Journal of Food, 16:1, 390-399, DOI: 10.1080/19476337.2017.1410499.

Beibei Huang, Jingli Hu, and Jeffrey Rohrer (2016), Determination of Organic Acids in Kombucha Using a High-Pressure Ion Chromatography System—ThermoFischer.

Biljana Bauer-Petrovska, Lidija Petrushevska-Tozi (2001), Mineral and water soluble vitamin content in the Kombucha drink—International Journal of Food Science and Technology, 35:2, DOI:10.1046/j.1365-2621.2000.00342.

United States Environmental Protection Agency, Profile of the Pulp and Paper Industry, Second Edition: EPA Office of Compliance Sector Notebook Project (November 2002).

The invention claimed is:

1. A cigarette rolling paper comprising:
   from 5% to 100% by weight cellulose from a microbe grown in a symbiotic colony of bacteria and yeast (SCOBY) formed during Kombucha culture and/or fermentation;
   wherein the cigarette rolling paper has a burn rate and a basis weight in the range of 10-40 GSM suitable for use as a cigarette rolling paper.

2. The cigarette rolling paper of claim 1, wherein the cigarette rolling paper has a permeability, porosity, tensile strength, tearing strength, and/or opacity suitable for use as a cigarette rolling paper.

3. The cigarette rolling paper of claim 1, wherein the paper has a burn rate in the range of 0.001-0.006 g/s, a porosity in the range of 1-10 CU, a tensile strength in the range of 10-35 N, and/or a tension strength in the range of 1-10%.

4. The cigarette rolling paper of claim 1, wherein the product does not comprise an adhesive.

5. The cigarette rolling paper of claim 1, wherein the product comprises less than 15 mg/Kg by weight of Crotonaldehyde.

6. The cigarette rolling paper of claim 1, wherein the product does not comprise harmful and potentially harmful constituents (HPHCs) selected from N-Nitrosonornicotine, Anabasine, or Isoprene.

7. The cigarette rolling paper of claim 1, wherein the product does not comprise harmful and potentially harmful constituents (HPHCs) selected from N-Nitrosonornicotine, Anabasine, Isoprene, Benzene, Toluene, NNK, 4-aminobiphenyl, 2-Naphthylamine, Acrolein, or 1,3-butadiene.

8. The cigarette rolling paper of claim 1, wherein the product does not comprise harmful and potentially harmful constituents (HPHCs) selected from Acetamide, Acetone, Acrolein, Acrylamide, Acrylonitrile, Aflatoxin B1, 4-Aminobiphenyl, 1-Aminonaphthalene, 2-Aminonaphthalene, Ammonia, Anabasine, o-Anisidine, Arsenic, A-α-C(2-Amino-9H-pyrido[2,3-b]indole), Benz [a]anthracene, Benz [j]aceanthrylene, Benzene, Benzo[b]fluoranthene, Benzo[k]fluoranthene, Benzo[b]furan, Benzo[c]phenanthrene, Beryllium, 1,3-Butadiene, Cadmium, Caffeic acid, Carbon monoxide, Catechol, Chlorinated dioxins/furans, Chromium, Chrysene, Cobalt, Coumarin, Cresols (o-, m-, and p-cresol), Crotonaldehyde, Cyclopenta[c,d]pyrene, Dibenz [a,h]anthracene, Dibenzo[a,e]pyrene, Dibenzo[a,h]pyrene, Dibenzo[a,i]pyrene, Dibenzo[a,l]pyrene, 2,6-Dimethylaniline, Ethyl carbamate (urethane), Ethylbenzene, Ethylene oxide, Furan, Glu-P-1 (2-Amino-6-methyldipyrido[1,2-a:3', 2'-d]imidazole), Glu-P-2 (2-Aminodipyrido[1,2-a:3',2'-d]imidazole), Hydrazine, Hydrogen cyanide, Indeno[1,2,3-cd]pyrene, IQ (2-Amino-3-methylimidazo[4,5-f]quinoline), Isoprene, Lead, MeA-α-C (2-Amino-3-methyl)-9H-pyrido [2,3-b]indole), Mercury, Methyl ethyl ketone, 5-Methylchrysene, 4-(Methylnitrosamino)-1-(3-pyridyl)-1-butanone (NNK), Naphthalene, Nickel, Nicotine, Nitrobenzene, Nitromethane, 2-Nitropropane, N-Nitrosodiethanolamine (NDELA), N-Nitrosodiethylamine, N-Nitrosodimethylamine (NDMA), N-Nitrosomethylethylamine, N-Nitrosomorpholine (NMOR), N-Nitrosonornicotine (NNN), N-Nitrosopiperidine (NPIP), N-Nitrosopyrrolidine (NPYR), N-Nitrososarcosine (NSAR), Nornicotine, PhIP (2-Amino-1-methyl-6-phenylimidazo[4,5-b]pyridine), Polonium-210, Propionaldehyde, Propylene oxide, Quinoline, Selenium, Styrene, o-Toluidine, Toluene, Trp-P-1 (3-Amino-1,4-dimethyl-5H-pyrido[4,3-b]indole), Trp-P-2 (1-Methyl-3-amino-5H-pyrido[4,3-b]indole), Uranium-235, Uranium-238, Vinyl acetate, or Vinyl chloride.

9. The cigarette rolling paper of claim 1, further comprising 0.1% or greater to 95% or less by weight of a non-microbial cellulose fiber comprising hemp, flax, eucalyptus, sisal, esparto, bamboo, perennial fibers, softwood and/or hardwood fibers, rag fibers, and/or cotton, or any combination thereof.

10. The cigarette rolling paper of claim 1, further comprising up to 50% by weight of a paper additive comprising calcium carbonate, formation aid PEO, lime, soda ash, coagulant, kaolin clay, flame retardant, gelatin sizing, sizing, and/or methyl cellulose, or any combination thereof.

11. The cigarette rolling paper of claim 1, further comprising at least one additive comprising a flavorant, a colorant, a vitamin, and/or a psychoactive ingredient, or any combination thereof, introduced in the SCOBY.

12. The cigarette rolling paper of claim 11, wherein the psychoactive ingredient comprises caffeine in a range of 500-2000 mg/Kg by weight.

13. The cigarette rolling paper of claim 11, wherein the flavorant comprises corylone in a range of 100-1000 mg/Kg by weight.

14. The cigarette rolling paper of claim 1, further comprising at least one plant derived nutrient substrate including acai, green tea, black tea, grape seed, aloe, hemp seed extract, hibiscus, yarrow, or agave.

15. A product comprising:
   a sheet of pulp processed into a cigarette rolling paper;
   wherein the pulp comprises from 5% to 100% by weight microbial cellulose from a biofilm harvested from a symbiotic colony of bacteria and yeast (SCOBY) formed during Kombucha culture and/or fermentation; and
   wherein the cigarette rolling paper has a burn rate and a basis weight in the range of 10-40 GSM suitable for use as a cigarette rolling paper.

16. The product of claim 15, wherein the product does not comprise an adhesive.

17. The product of claim 15, wherein the product does not comprise harmful and potentially harmful constituents (HPHCs) selected from N-Nitrosonornicotine, Anabasine, or Isoprene.

18. The product of claim 15, wherein the product does not comprise harmful and potentially harmful constituents (HPHCs) selected from N-Nitrosonornicotine, Anabasine, Isoprene, Benzene, Toluene, NNK, 4-aminobiphenyl, 2-Naphthylamine, Acrolein, or 1,3-butadiene.

19. A method comprising:
   culturing a symbiotic colony of bacteria and yeast (SCOBY) to form a biofilm;
   harvesting the biofilm;
   preparing a pulp comprising from 5% to 100% by weight microbial cellulose from the biofilm; and
   manufacturing a cigarette rolling paper from the pulp;
   wherein the cigarette rolling paper has a burn rate and a basis weight in the range of 10-40 GSM suitable for use as a cigarette rolling paper.

20. A paper product having a burn rate and a basis weight in the range of 10-40 GSM suitable for use as a cigarette rolling paper, the paper product comprising from 5% to 100% by weight microbial cellulose, wherein the microbial cellulose is obtained from a process comprising:

culturing a symbiotic colony of bacteria and yeast (SCOBY) formed during Kombucha culture and/or fermentation to form a biofilm;
harvesting the biofilm; and
preparing a pulp from the biofilm to obtain the microbial cellulose.

* * * * *